Dec. 11, 1956   J. B. McGAY ET AL   2,773,642
INTEGRATOR
Filed April 17, 1953   10 Sheets-Sheet 1
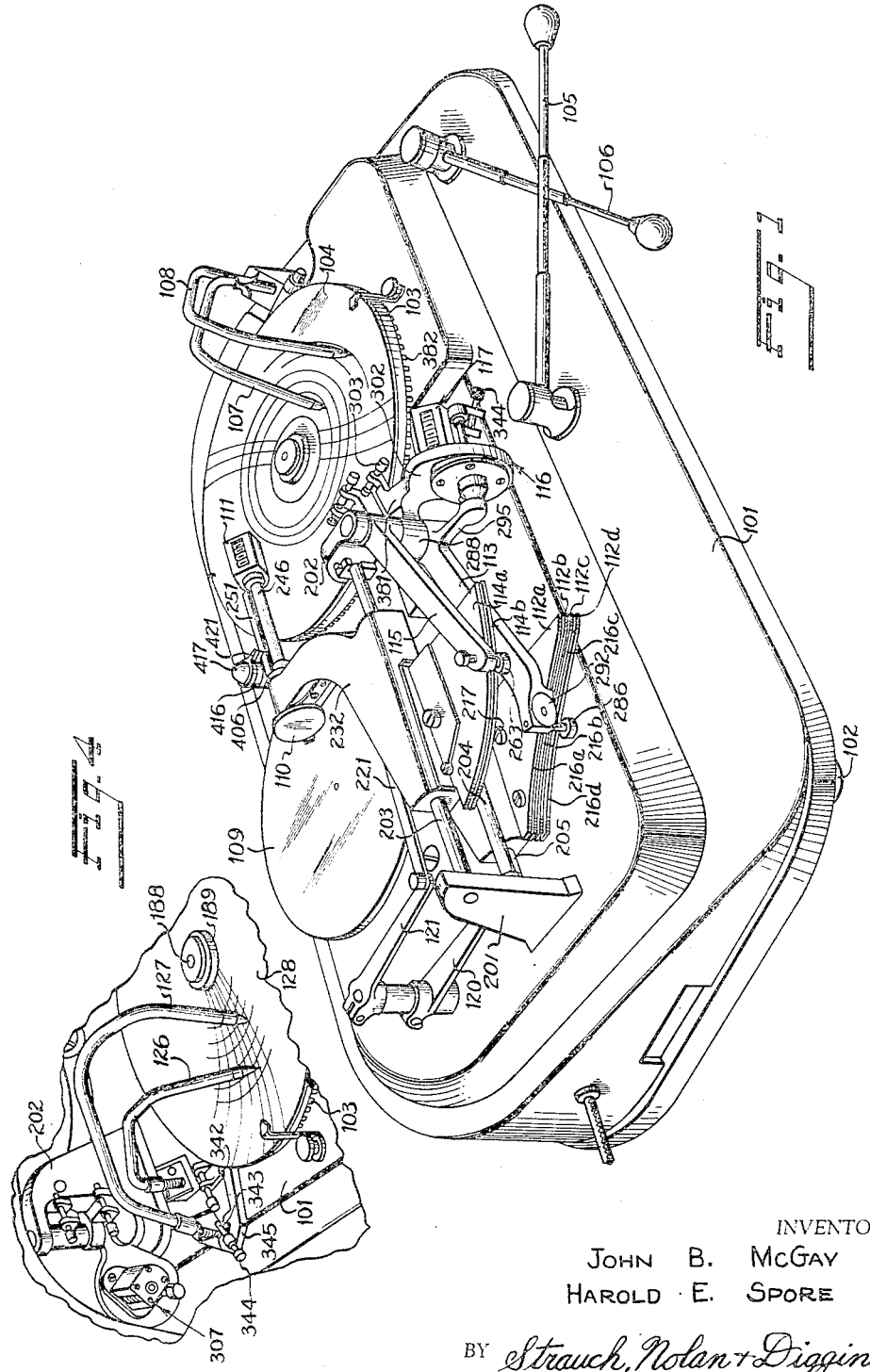
INVENTORS
JOHN B. McGAY
HAROLD E. SPORE
BY Strauch, Nolan + Diggins
ATTORNEYS

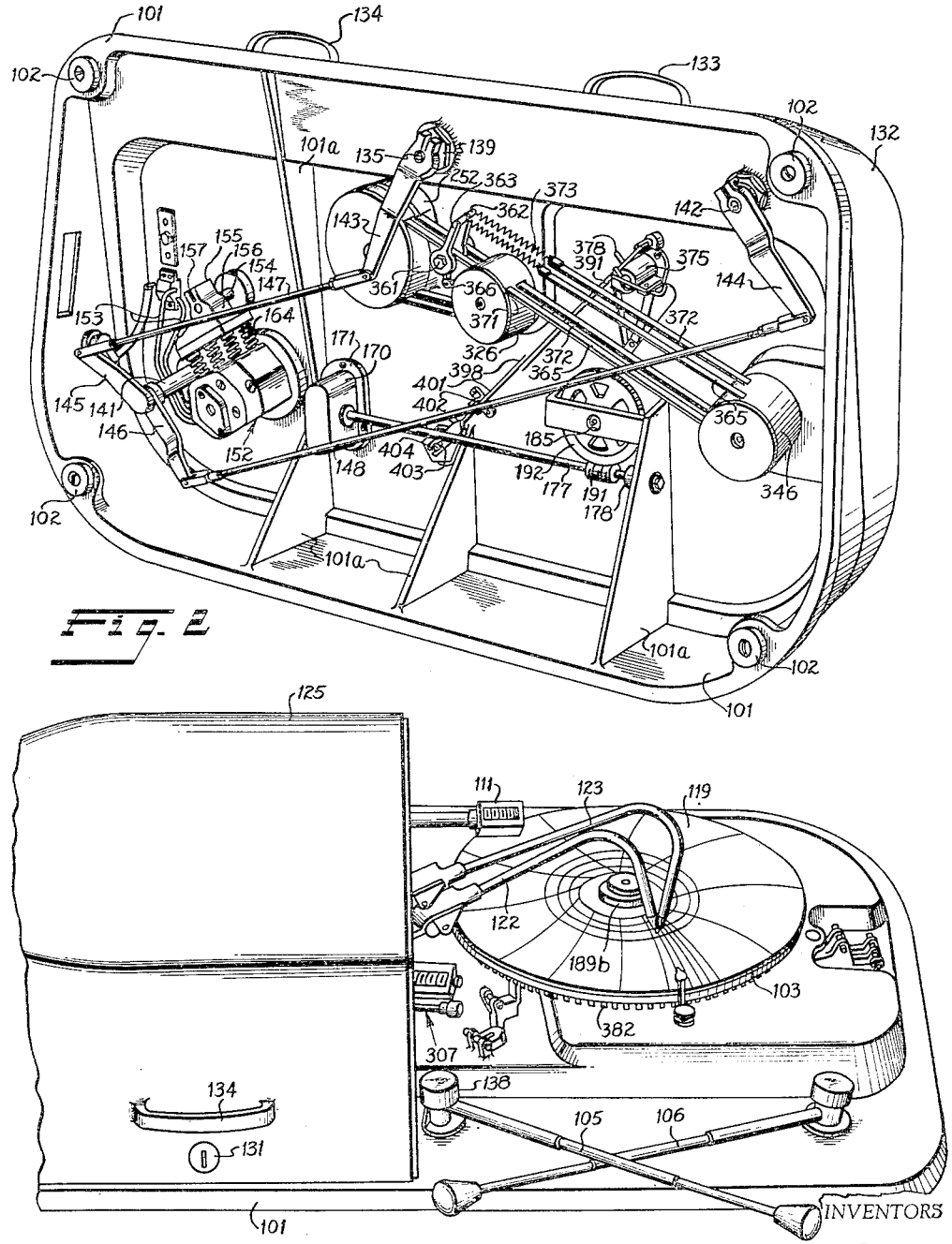

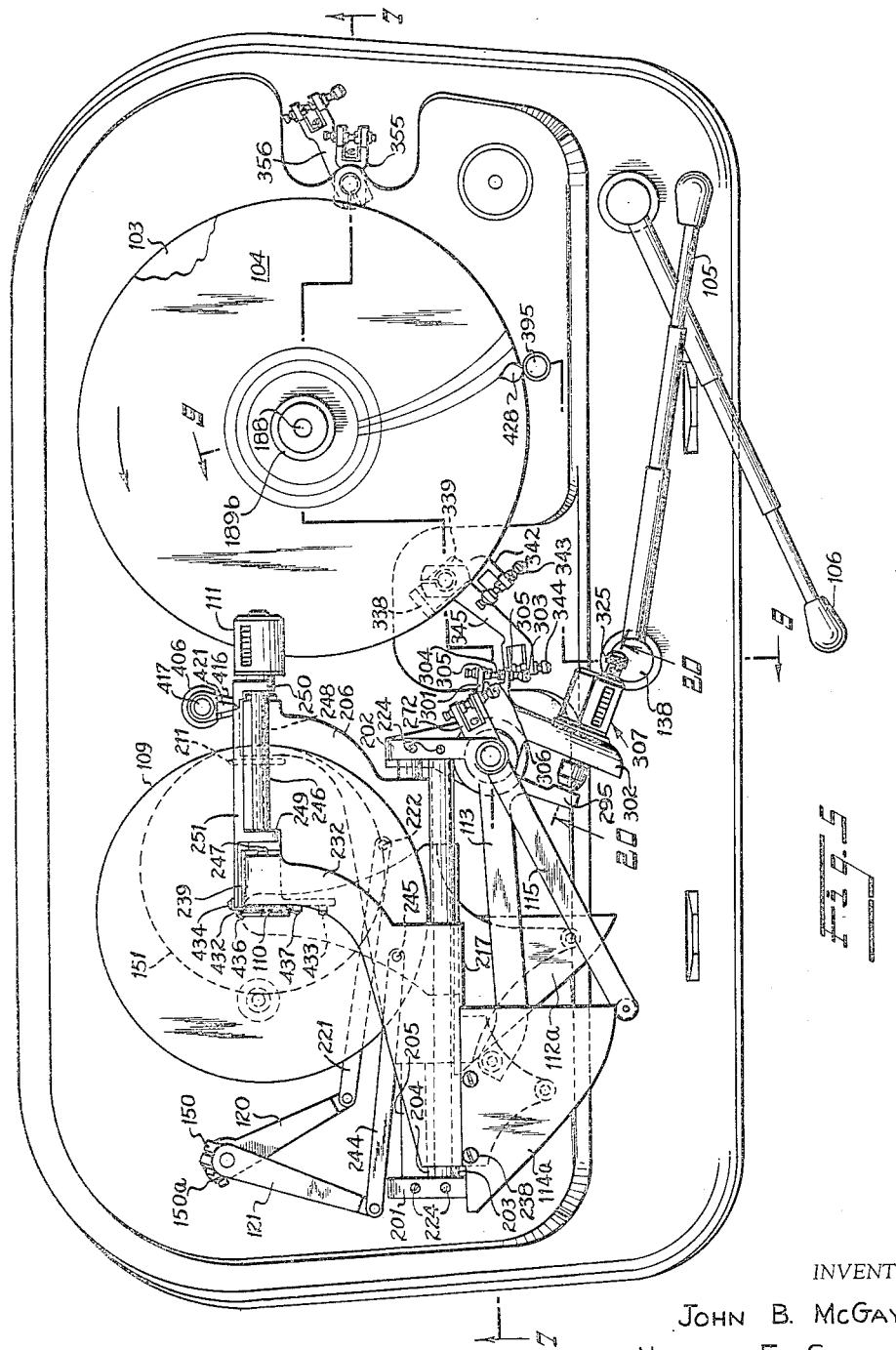

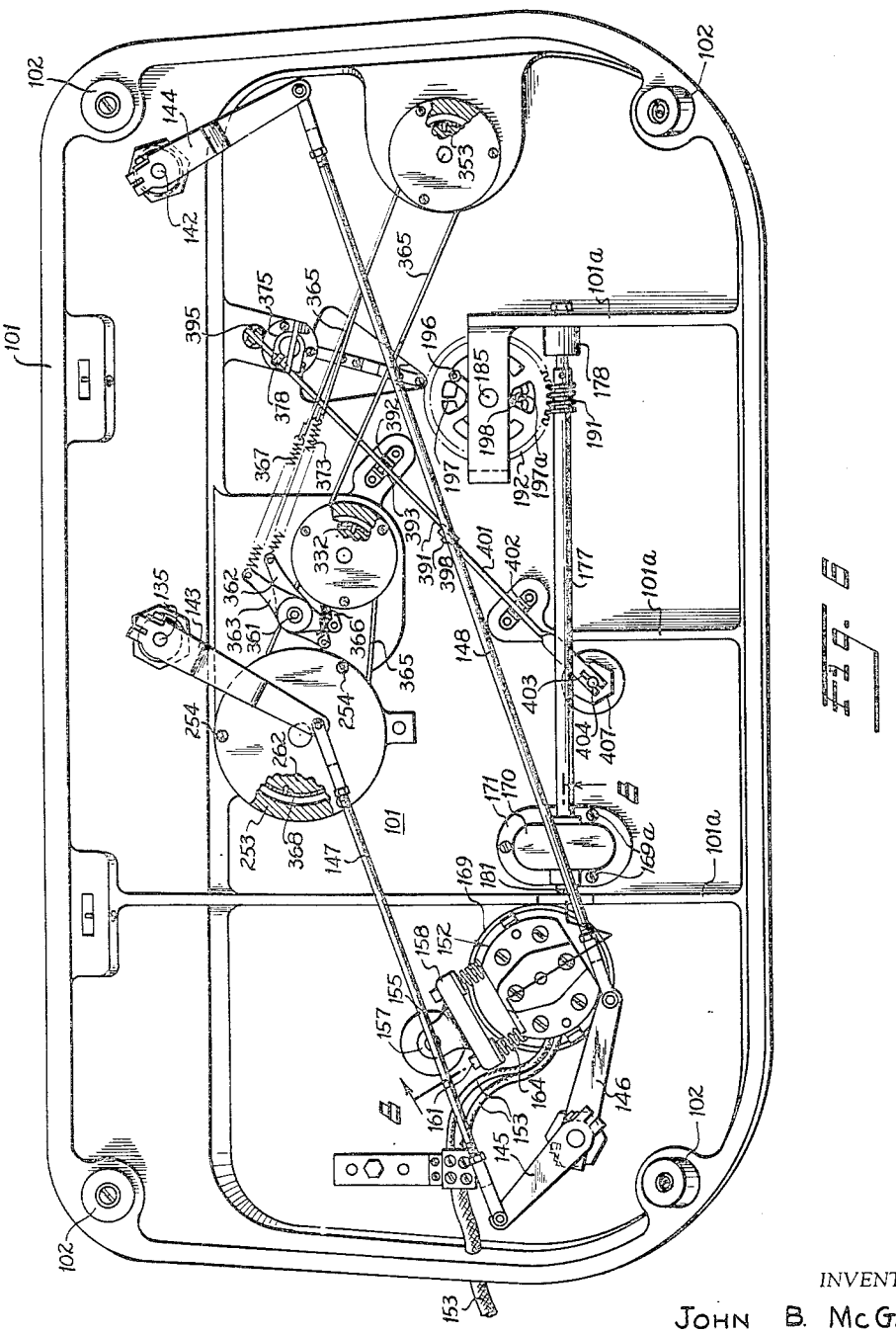

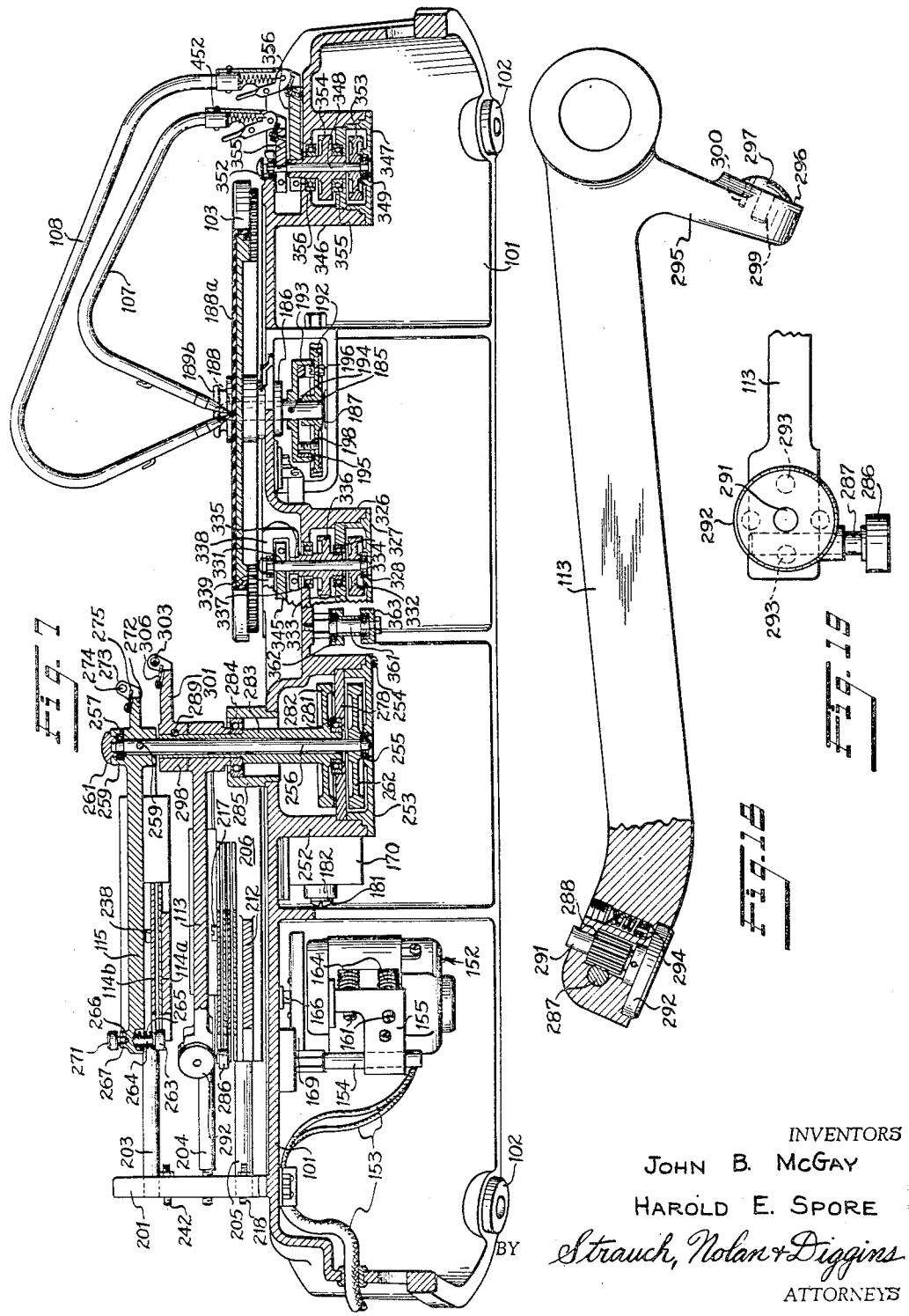

Dec. 11, 1956   J. B. McGAY ET AL   2,773,642
INTEGRATOR

Filed April 17, 1953   10 Sheets-Sheet 6

Fig. 8-A

INVENTORS
JOHN B. McGAY
HAROLD E. SPORE
BY Strauch, Nolan & Diggins
ATTORNEYS

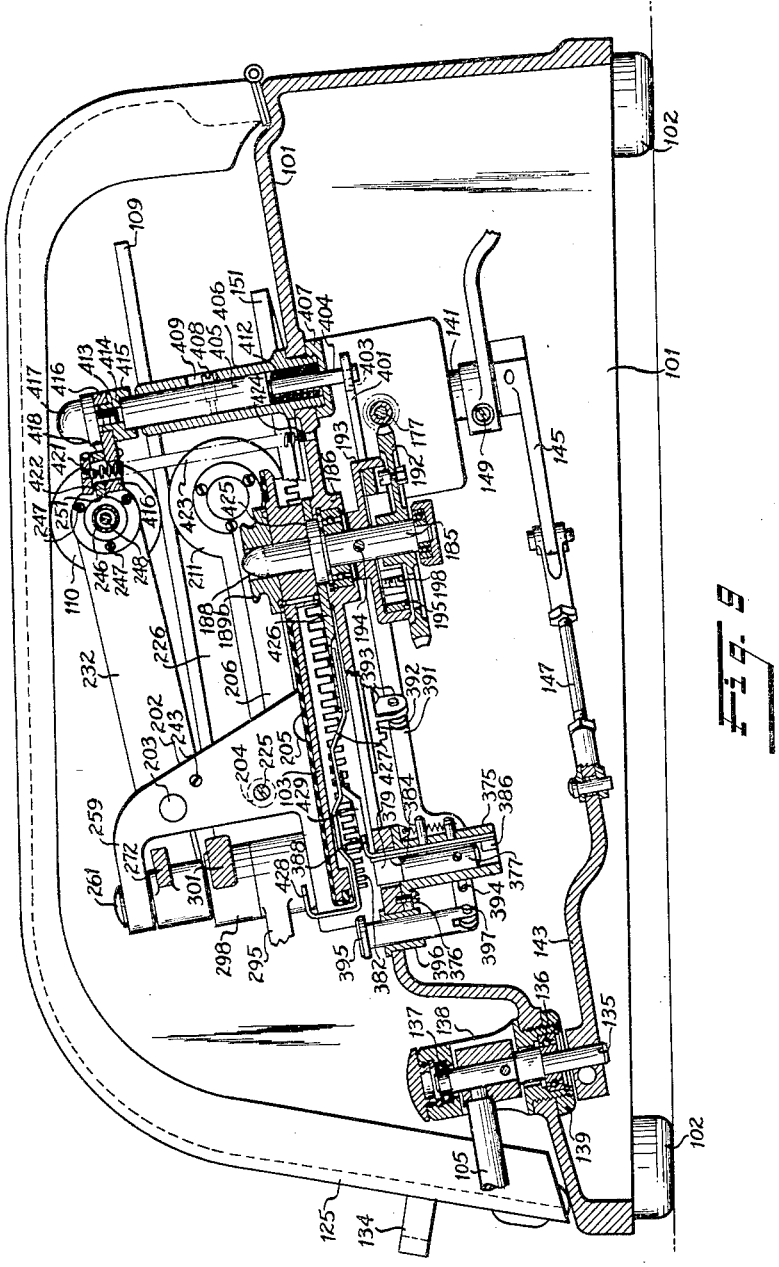

Dec. 11, 1956   J. B. McGAY ET AL   2,773,642
INTEGRATOR
Filed April 17, 1953   10 Sheets-Sheet 8
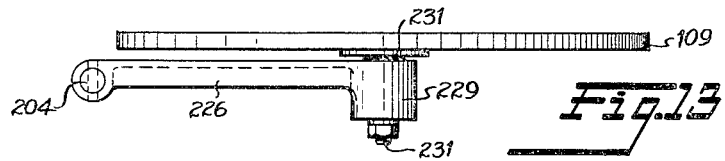
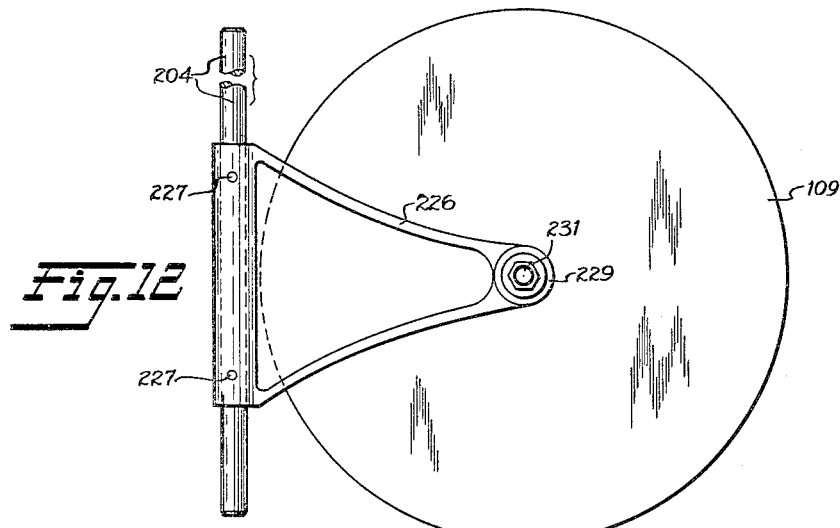
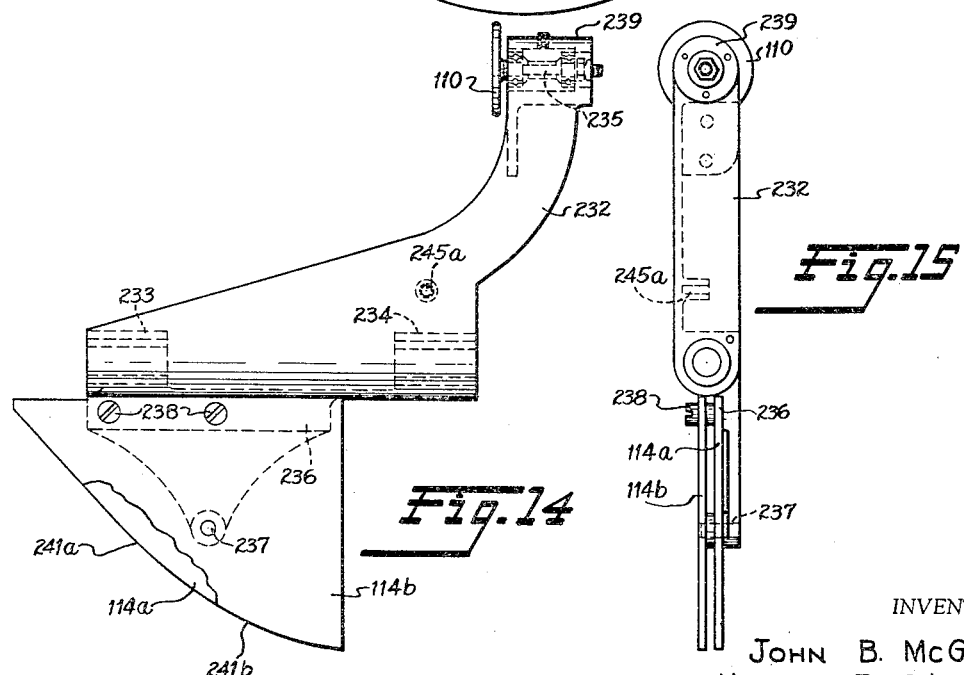
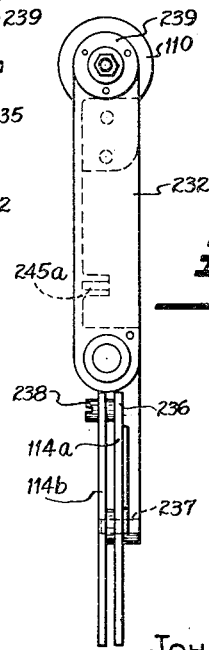
INVENTORS
JOHN B. McGAY
HAROLD E. SPORE
BY *Strauch, Nolan & Diggins*
ATTORNEYS Dec. 11, 1956  J. B. McGAY ET AL  2,773,642
INTEGRATOR
Filed April 17, 1953  10 Sheets-Sheet 9
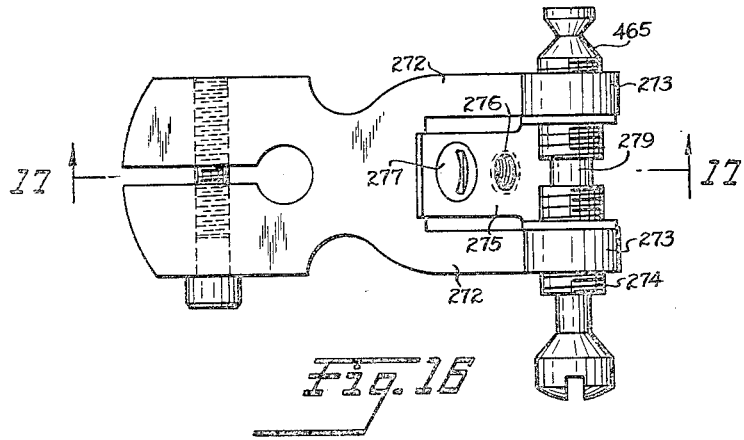
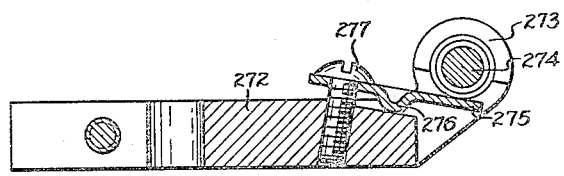
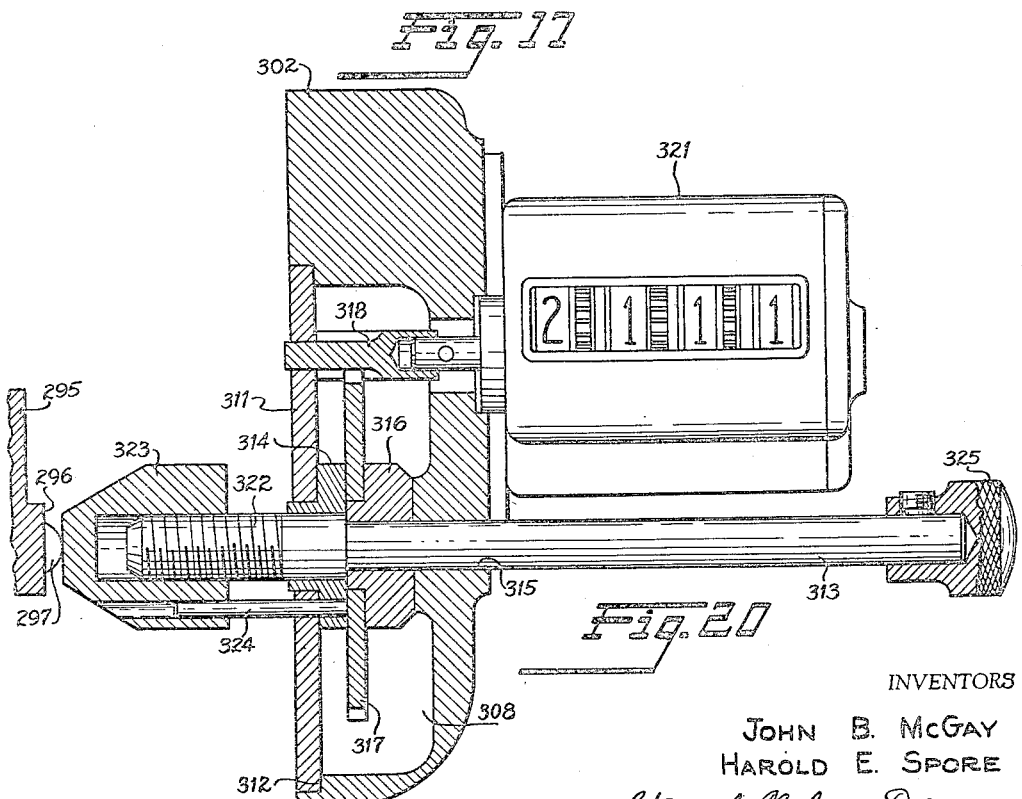
INVENTORS
JOHN B. McGAY
HAROLD E. SPORE
BY *Strauch, Nolan & Diggins*
ATTORNEYS

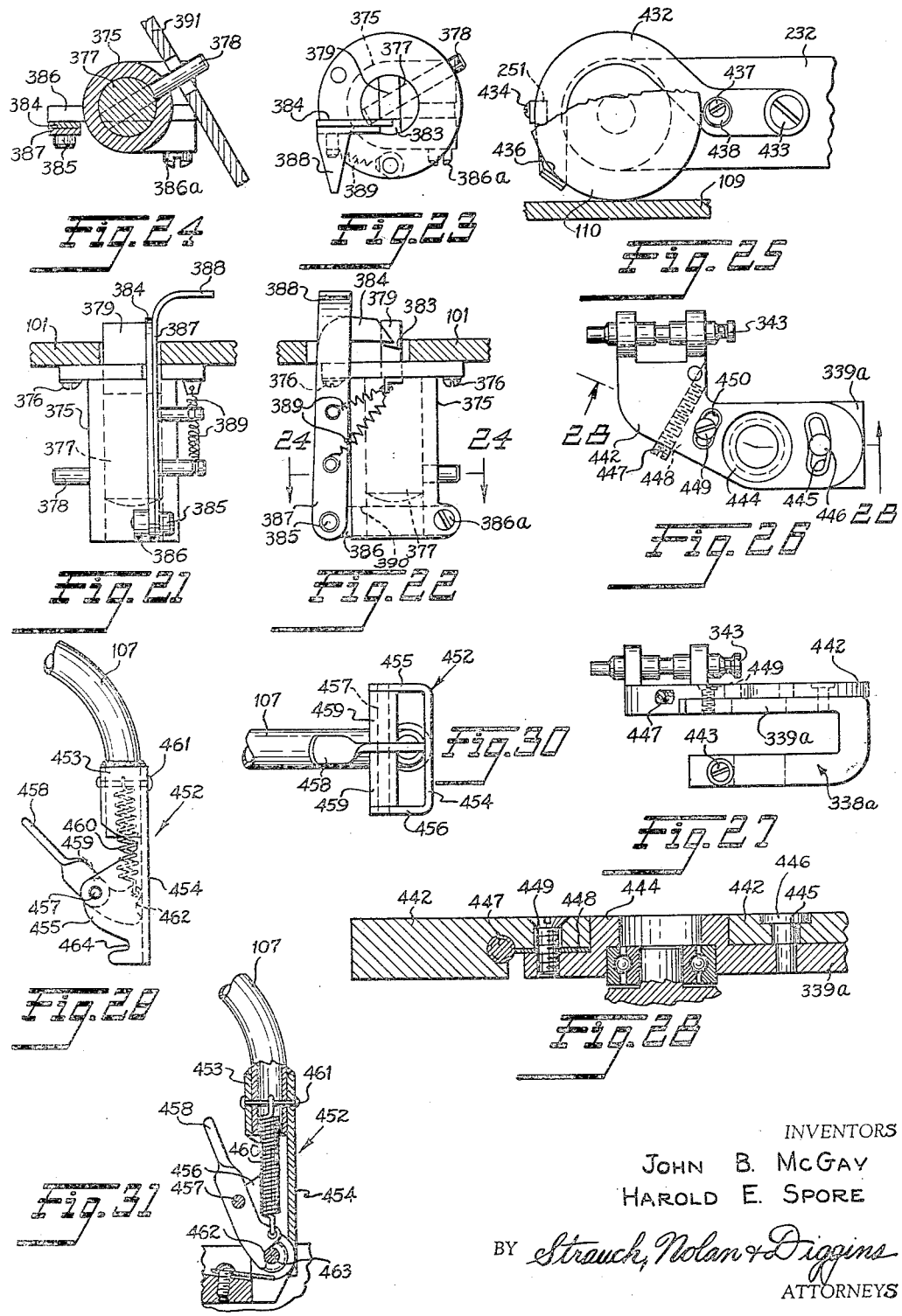

United States Patent Office 2,773,642
Patented Dec. 11, 1956

2,773,642

INTEGRATOR

John B. McGay and Harold E. Spore, Tulsa, Okla., assignors to Rockwell Manufacturing Company, Pittsburgh, Pa., a corporation of Pennsylvania Application April 17, 1953, Serial No. 349,488

34 Claims. (Cl. 235—61)

Our present invention relates to instruments designed to integrate the curves of charts of orifice type meters and the like, wherein a plurality of recording pen traces are made upon circular charts to record the differential pressure across an orifice meter as well as the static pressure at the meter. In particular, the instruments of our invention have the function of computing or integrating from the graphic records upon the charts, the total volume of fluid, such as a gas, that has passed through a pipe line as measured by an orifice meter.

In using orifice meters to measure the flow of fluids through pipe lines a plate having an orifice there-through is commonly inserted in the pipe line and a circular disc type chart is driven at a constant speed, for example one revolution during a 24 hour period, while a pair of recording pens trace upon the chart a pair of lines, one representing the static pressure at the orifice plate and the other representing the differential pressure across the orifice plate, according to the movements of pressure responsive mechanism that actuates the pens. In accordance with the laws of the flow of fluids the average rate of flow of the fluid is equal to a constant multiplied by the square root of the product of the average absolute static pressure and the average differential pressure across the orifice.

There are three of such orifice meters in common use, the "Rockwell-Emco," the "Westcott" and the "Foxboro." Each has different characteristics such as the relation of pen center to chart center, the total swing of the pen arms, the location of the static pressure zero or atmospheric pressure line with respect to the chart center, etc. To integrate charts produced by all three of these most popular orifice meters, the integrator disclosed in the United States Patent No. 2,128,834 issued August 30, 1938 to John B. McGay one of the inventors in this case, has been and is being used in large numbers.

Our present invention relates to improvements in such integrators which provide easier and more facile calibration, operation and adjustments, with reduced initial cost of the instrument and considerable reduced time required for assembly and calibration.

Gauge static pressure graduations are commonly used in orifice meter charts, and vary widely in range and spacing. Integration of recorded volume must, however, be based on absolute pressures. Accordingly the zero setting of the static pressure pen varies with the atmospheric pressure at the place of measurement and with the pressure range of the chart. To effect the absolute zero adjustment in our prior machine required the use of different setting holes on the pressure arm mechanism individual to the particular chart to establish the proper zero position of the pen for each different atmospheric pressure and each different pressure range. Accordingly, an average of 30 to 40 minutes was used in properly locating each of up to 26 or more holes in each of three sets of holes in our prior machine since it was necessary to drill the holes with the plate and arm assembled. In our present invention we provide a single micrometer adjustment for all three pen arms provided with an indicator which accurately shows the set-back of each pen arm mounting from the gauge zero pressure graduation as the actual numerical value of the atmospheric pressure, or a direct multiple thereof depending upon the pressure range. The provision of a single micrometer adjustment to properly and readily set any one of a plurality of pen arms to absolute zero or to any given atmospheric pressure is accordingly a primary object of our present invention.

In the prior machine, pen arm assemblies with auxiliary pen arm centers were necessary for two of the charts to be integrated, because of the pen arm drive utilized. In our present invention we provide an improved simplified pen arm drive permitting simple substitution of pen arms which may be readily snapped into place and removed, and the raising and lowering of the pen arm shafts of the prior machine is eliminated.

Angularity, lost motion, friction and backlash effects were inherent in the driving gear and linkage connections to the pen arm centers in the prior machines. These introduced errors requiring difficult cam corrections and compromises in accuracy. Operation of the handles used by the operator in tracing the recorded curves is difficult under any circumstances in such machines and these difficulties were magnified due to spring load variations necessary to feed the cams in the prior machine. Such prior errors, corrections and compromises and spring load variations are eliminated in our present invention by the use of an improved spring biased tape and drum drive connecting and driving all of the pen arm centers together. While our improved drive arrangement is disclosed on an integrating machine, it is applicable to a variety of other uses. The provision of such an improved drive mechanism is accordingly a further object of our invention. An improved chart plate start and stop control mechanism is provided which includes a brake shoe arrangement movable with the differential wheel, thus eliminating the dragging of the wheel or the brake of the prior machines.

It is therefore a general object of the present invention to provide a new and improved chart integrating machine less difficult and costly to produce and of simplified construction which may be operated more easily and more accurately, and which is easier to adapt to the integration of different types of orifice meter charts.

In the prior machine the manner of mounting the pen arm assemblies was such as to require zero adjustment of the pen arms after mounting on their driving centers. Another object of our invention is the provision of a novel snap on and off pen arm mounting which positions the pens accurately without the need of zero adjustment in normal operation of the machine.

In the prior machine it was necessary to shift the entire Westcott pen shaft assembly in shifting the cam follower rollers from one cam to another. A further object of the present invention is the provision of simplified means for setting the cam follower rollers to the proper cam for the chart to be integrated, without requiring shift of the entire shaft assembly carrying the cam follower arms.

Other objects will become apparent as the description proceeds in connection with the accompanying drawings, wherein:

Figure 1 is a perspective view of the top of the integrator, with the entire cover removed, and one set of pen arms in place.

Figure 2 is a perspective view of the bottom of the machine.

Figure 3 is another perspective view of the top of the integrator, with half of the cover removed, and a second set of pen arms in place.

Figure 4 is another perspective view of a portion of the top of the integrator, and showing the third set of pen arms in place.

Figure 5 is a top plan view of the integrator, with the entire cover removed, and without any of the pen arms in place.

Figure 6 is a bottom plan view of the integrator.

Figure 7 is a vertical sectional view through the integrator, substantially along the line 7—7 of Figure 5.

Figure 8A is a similar view of a preferred and simplified embodiment;

Figure 9 is a vertical section through the integrator substantially along the line 9—9 of Figure 5;

Figure 12 is a bottom plan view of the pressure plate and pivoted supported bracket;

Figure 13 is a side view of Figure 12 as viewed from the top thereof;

Figure 14 is a top plan view of the differential pressure carriage.

Figure 15 is a side elevation of the carriage of Figure 14, as viewed from the right of Figure 14;

Figure 16 is an enlarged detailed plan view of one of the pen arm supports;

Figure 17 is a vertical sectional view along line 17—17 of Figure 16;

Figure 18 is an enlarged top plan view of the static pressure cam follower arm and including a horizontal section through its mid-point at its outer end;

Figure 19 is a view in side elevation of the cam follower at the outer end of the arm of Figure 18;

Figure 20 is a vertical sectional view substantially along the line 20—20 of Figure 5;

Figure 21 is an enlarged side elevation view of a portion of the stop mechanism for the chart plate 103, shown more generally in Figure 9;

Figure 22 is a view of the mechanism of Figure 21, viewed from the right of Figure 1;

Figure 23 is a top plan view of Figure 22;

Figure 24 is a sectional view along the line 24—24 of Figure 22;

Figure 25 is an enlarged end view of the counter wheel brake and lever that are shown in top plan view in Figure 5;

Figures 26 and 27 are top plan and side elevation views respectively of a novel means for adjusting the angular position of a pen arm mounting with respect to the shaft upon which it is mounted;

Figure 28 is a sectional view along line 28—28 of Figure 26;

Figure 29 is a view in side elevation of the inner end of a pen arm, showing the spring clip attaching means.

Figure 30 is a bottom plan view of Figure 29.

Figure 31 is a view similar to Figure 29, but in section, and showing the pen arm attached to the arm of a pen arm center assembly.

Figures 8, 10, 11:
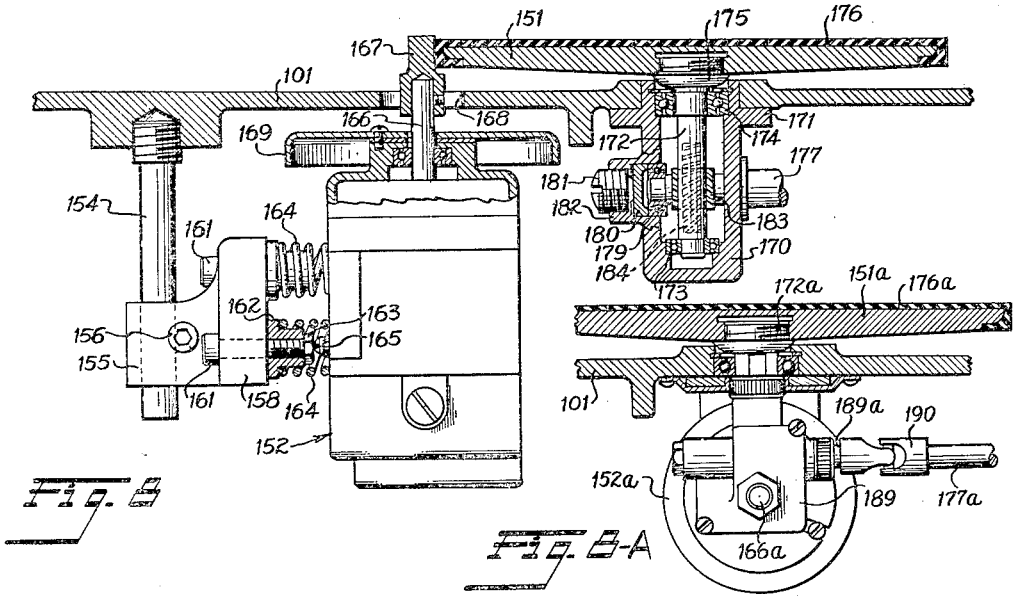
Figure 8 is a vertical section through one form of the drive motor and mounting and the axis of the time plate, taken substantially along the line 8—8 of Figure 6.
Figure 10 is a top plan view of the static pressure carriage assembly.
Figure 11 is a view in side elevation of Figure 10, as viewed from the right.

Referring to the drawings, the integrator mechanism is mounted upon a hollow cast base 101 having resilient supports 102, some of the mechanism being mounted on top of the base and other portions being mounted upon its underside within the hollow, as is apparent from Figures 1 and 2. The base has several internal stiffening webs 101a as best shown in Figure 2.

Visible generally in Figure 1 and also in Figure 5 are the motor driven chart plate 103 with a chart 104 secured thereto, the differential pressure operating lever 105, the static pressure operating lever 106, one differential pressure pen arm 107 controlled by the operating lever 105 and one static pressure pen arm 108 controlled by the operating lever 106. Also shown is the rotatable pressure plate 109, the counter-wheel 110 driven thereby, and the counter 111. A series of four reciprocable static cams 112a, 112b, 112c and 112d and cam follower arm 113 are shown and above them are the pair of differential cams 114a and 114b and cam follower arm 115. Indicated generally at 116 is a set-back assembly including a second counter 117, the purpose of which will be explained later. In Figure 10 only the upper cam 112a is shown, but all four appear in Figure 11. Also shown in Figures 1 and 5 are a (lower) static pressure carriage control lever 120 that shifts the static cams 112a—112d in response to the operator's movements of the static pressure operating lever 106 and an (upper) differential pressure carriage control lever 121 that shifts the differential pressure cams 114a and 114b in response to the operator's movements of the differential pressure operating lever 105.

In Figure 3 the same machine or integrator is shown as in Figure 1 except that another set of pen arms is shown, arm 122 being the static pressure pen arm and arm 123 being the differential pressure pen arm, and a different chart 119 being mounted upon the chart plate 103. A left hand cover 125 is shown in the closed position that it may normally be in during an integrating operation.

In Figure 4 is shown another perspective view of a portion of the same machine with still a third set of pen arms in place, 126 being the static pressure pen arm and 127 being the differential pressure pen arm, and 128 being the chart used with these pen arms. It should be understood that the same machine is shown in Figures 1, 3 and 4, the only differences being in the substitution of the proper charts 104, 119 or 128 and in the substitution of the proper sets of pen arms to correspond with the charts.

In Figure 2 the machine or integrator has been turned up on its side so as to expose to view the mechanism within the hollow cast base 101. In the figure the high hand cover 132 is in place, handle 133 being attached to this cover, and handle 134 being attached to the left hand cover 125. Suitable latches or locks such as that shown at 131 in Figure 3 hold the covers 125 and 132 in closed position when desired.

Referring to Figures 2, 5 and 9, the operating levers 105 and 106 are each attached to and journalled for rotation with respect to the base 101. The details of the journalled mounting for differential pressure lever 105 are shown in Figure 9, wherein shaft 135 is shown journalled in a pair of spaced ball bearing assemblies 136 and 137 mounted within a bracket 138 passing through and secured to the cast base 101 by a nut 139. The static pressure operating lever 106 is similarly mounted and secured to a similar shaft 142 (Figure 2). Levers 143 and 144 (Figure 2) are rigidly mounted upon the lower ends of shafts 135 and 142 respectively for movement therewith as the operating levers 105 and 106 are turned, and are connected to turn levers 145 and 146 by means of adjustable length connecting rods 147 and 148. Levers 145 and 146 are mounted upon the lower ends of outer and inner concentric shafts (only outer shaft 141 being shown) that are suitably journalled in the base 101 for rotation about a vertical axis, and which rigidly mount for rotation the control levers 120 and 121 of Figures 1 and 5. All of the levers 120, 121, 145 and 146 are suitably mounted as by set screws 149 of Figure 9 or the clamping arrangement shown in Figure 5 at 150 and 150a so that they may be variously adjusted about the concentric shafts that mount them. As will be subsequently described, movement of the differential pressure and static pressure operating levers 105 and 106 by the operator will cause the sets of pen arms shown in Figures 1, 3 and 4 to follow the recorded lines on the charts 104, 119 and 128 of the same figures, and in each case, depending upon the chart being integrated and the matching pen arms used for that particular chart, the counter 111 will indicate a multiple of the number of cubic feet of gas recorded by the record lines of the particular chart for one revolution of the chart.

As is well known to those skilled in the art, the chart plate 103 and a time plate 151 (Figures 5 and 9) are rotated at fixed relational speeds by an operator controlled variable speed motor. This motor is indicated at 152 in Figures 2, 6 and 8, the power lines being indicated at 153. Normally a foot-operated rheostat (not shown) in the power lines 153 is controlled by the operator of the integrator to control the speed of the motor.

*Motor drive for time and chart plates*

Details of one form of the improved motor mounting and drive for the time plate 151 are shown in detail in Figure 8. As shown here, a vertical stud 154 is threaded into the bottom of the cast base 101 and a bracket 155 having a bore with a longitudinal split 157 (Figures 2 and 6) is mounted upon the stud 154, being clamped in any angular or vertical position by means of a screw 156. The bracket 155 includes a flat face plate 158 to which the motor 152 is secured by four machine screws 161, passing through the face plate 158 and through four cylindrical rubber bushings 162 (Figure 8) which are clamped against the face plate by nuts 163 on the screws. The casing of the motor 152 has a flat side to which are secured four coil springs 164, each being generally cylindrical but having a reduced end through which passes a screw 165 threaded into the flat side of the motor casing. The inner diameter of the coil springs 164 is such that the springs can be forced over the rubber bushings 162 to mount the motor upon the face plate 158 of the bracket 155 in a vibration-proof manner so that no motor vibration will be transmitted to the hollow cast base 101. Tightening of nuts 163 will squeeze the rubber bushings 162 tighter against the insides of coil springs 164, as will be understood.

As best seen in Figure 8, the motor 152 has a vertical shaft 166 mounted in ball bearings, the upper end of the shaft being provided with a chromium plated metallic driving sleeve 167 secured to the motor shaft for rotation therewith, and protruding through a hole 168 in the base 101 for driving engagement with the peripheral edge of the time plate 151. A cup shaped motor cover 169 is secured to the top of the motor and beneath the hole 168 to protect the motor from foreign matter that might pass through the hole 168.

The details of the mounting of the motor driven time plate 151 are also shown in Figure 8. An oblong cup shaped housing 170 is secured to the bottom of the base 101 as by screws 169a (Figure 6) passing through a flange 171 on the housing. A vertical shaft 172 is mounted for rotation in lower and upper ball bearing assemblies 173 and 174 in the housing 170, the upper end of the shaft 172 being threaded and having a seating flange 175 at the bottom of the threads. The disc shaped time plate 151 has a threaded blind bore at its center, and the threads on the shaft 172 are threaded into this threaded bore until the time plate is seated snugly upon the flange 175. The time plate 151 has a flat upper surface, and this surface as well as its peripheral edge are covered with a rubber surface 176 best shown in the sectional view of Figure 8. The respective centers of the motor shaft 166 and the time plate shaft 172 are such that the driving sleeve 167 on the upper end of the motor shaft has a good frictional driving engagement with the rubber surface 176 on the peripheral edge of the time plate.

Figure 8A shows a preferred and simplified drive motor and mounting arrangement for the time plate, herein designated by reference number 151a, fixedly mounted upon the top of rotatable vertical shaft 172a, and rubber covered at 176a, all as in Figure 8. However, in Figure 8A the vertical shaft 172a is a vertical output shaft of a gear box 189 which is directly mounted upon the casing of a constant speed motor 152a that has a horizontal shaft coaxial with the gear box input shaft 166a extending through the gear box. The gear box 189 also has a horizontal output shaft 189a to which is affixed one end of a universal joint 190, the other end of which is affixed to an end of shaft 177a that drives the chart plate 103 in the same manner that it is driven by shaft 177 of Figure 8, which drive will be next described. The gears within the gear box 189 are so dimensioned as to drive the time plate and chart plate at the proper speeds.

The chart plate 103 is directly driven by the time plate 151 in the following manner. Referring to Figures 2 and 8 a drive shaft 177 is journalled for rotation at its left end in a ball bearing assembly 179 in the housing 170 and at its right end in a ball bearing assembly (not shown) in a boss 178 on the rightmost reinforcing web 101a. End play in the drive shaft 177 is eliminated by means of the take-up screw 181 in the boss 182 on the housing 169 and which bears against a recessed plate 180 that engages only the outer race of the bearing assembly. A hardened steel worm drive gear 183 is keyed to the time plate shaft 172 and has driving engagement with a soft steel or fiber driven worm gear 184 keyed to the drive shaft 177 within the housing 70, gear 183 being smaller than gear 184 whereby the speed of drive shaft 177 is less than that of the time plate 151. A vertical shaft 185 for the chart plate 103 is mounted in a pair of spaced ball bearing assemblies in bosses 186 and 187 (Figure 7), the chart plate 103 being seated against a suitable shoulder on shaft 185 and being keyed or otherwise secured to the shaft. The upper end of the shaft 185 terminates in a nose 188 for centering the charts 104 that are placed upon the chart plate 103 for integration. The chart plate itself is covered on its upper surfaces and peripheral edge (Figure 7) with a coating 188a of rubber or the like material to increase the frictional contact between the chart and the chart plate. After the chart is placed over the nose 188 a knob 189b is placed upon the nose. This knob may have a groove in its inner surface to receive prongs protruding through the chart 104 from the chart plate, as shown in Figure 9, and as disclosed in the aforesaid McGay Patent No. 2,128,834.

As best shown in Figures 2 and 6 the drive shaft 177 has secured to it adjacent its right end a worm gear 191 of soft steel or fiber. This worm gear 191 has a driving engagement with a driven worm wheel 192 that is journalled for rotation upon the chart plate shaft 185 and may rest upon the inner race of the ball bearing assembly mounted in the lower boss 187 and that journals the lower end of shaft 185. Worm wheel 192 is preferably of bronze or some other material that has a minimum coefficient of friction with respect to the worm gear 191. A cup shaped clutch drum 193 (Figure 7) is keyed by a pin 194 to the shaft 185 to drive the shaft and chart plate 103. Within the clutch drum 193 is mounted a hollow cylindrical clutch shoe 195 that is secured to gear 192 for rotation therewith by a screw 196. Shoe 195 has a radial slot at 197 (Figure 6) which permits expansion or contraction of the shoe. A tapered bolt 198 threaded into a tapered hole in the shoe diametrically opposite to the slot 197 is threaded into or out of the tapered hole to adjust the frictional contact of the shoe with the clutch drum 193. As shown in Figure 6 the radial slot 197 is continued partially through the shoe at 197a to permit flexibility of the shoe in the region of the tapered bolt 198. By means of the tapered bolt 198 the frictional clutch comprising drum 193 and shoe 195 is adjusted so that the clutch will drive the chart plate 103 at the same speed as the worm wheel 192, but when the chart plate is stopped by mechanism to be described the clutch will permit continued rotation of the worm wheel 192 which continues to be driven from the motor through the time plate 151 until the operator cuts off the motor current by means of the customary motor control switch, not shown. The friction clutch described is constructed substantially similar to that shown in the aforesaid McGay Patent No. 2,128,834.

*Integrating discs and wheels*

Referring to Figures 1 and 5, a pair of spaced brackets 201 and 202 are secured to the top of the base 101 forward of the time plate 151, serving as supports for three rods, namely an upper or differential pressure carriage rod 203, a central pressure plate rod 204 and a lower static pressure carriage rod 205 (see also Figure 9).

Rotatably and slidably mounted upon the lower rod 205 is a static pressure carriage the details of which are shown in Figures 10 and 11. A pair of spaced bosses 207 and 208 are bored to have a sliding and rotating fit upon the rod 205. At the end of one arm a static pressure roller wheel 211 is journalled for free rotation by ball bearing assemblies about an axis parallel to the axis of carriage rod 205. The roller wheel 211 is preferably metallic with a polished chromium plated periphery. On the opposite side of the bosses 207 and 208 is an arm 212 having a flat shoulder 213 and a spacer bushing 214 for the mounting of the static cam plates 112a, 112b, 112c and 112d (see also Figure 5) the curved cam edge 216a, 216b, 216c or 216d of each of which is shaped in accordance with the chart to be integrated, as well known by those skilled in the art. A pair of screws 217 fasten the four cam plates securely in place. The weight balance of the carriage 206 about the carriage rod 205 is such that the roller wheel will rest lightly upon the rubber or neoprene covered surface of the time plate 151 so as to be driven thereby.

The dimensions of the carriage 206 are such that when the carriage is shifted longitudinally along the carriage rod 205 the roller wheel 211 will contact the surface of the time plate 151 along a radius that parallels the carriage rod 205. A set screw stop 218 (Figure 7) threaded through bracket 201 limits the leftward movement of the static pressure carriage 206 so that the static pressure roller wheel 211 will be unable to move leftward of the center of the time wheel 151. A similar set screw (not shown) through the other bracket 202 keeps the roller wheel 211 from running off the outer edge of the time wheel 151. The lateral shifting movement of the static pressure carriage, and hence the position and speed of the static pressure roller wheel is controlled by the static pressure control lever 120 (Figures 1 and 5) to the outer end of which the carriage 206 is connected by a link 221 (Figure 5) and a pin 222 through the link 221 and a hole 223 (Figure 10) in the carriage. Movement of this static pressure control lever 120 is under the control of the operator by movement of the static pressure operating lever 106 as previously explained.

The upper and lower carriage rods 203 and 205 are secured against movement in the brackets 201 and 202 by means of lock screws 224 (Figure 5). However, the central rod 204 is free to rotate within the brackets, endwise movement being prevented as by pivot screws one of which is shown at 225 in Figure 9, the rod being mounted upon the pointed ends of the pivot screws. A bracket 226 (Figure 12) is fixedly mounted upon the rod as by a pair of pins 227, and at its other end it has a hollow boss 229 containing a pair of spaced ball bearing assemblies journalling a vertical shaft 231 which is rigidly secured to circular pressure plate 109. Since there is no counterweight on the bracket 226, the entire weight of the bracket 226 and pressure plate 109 will rest upon the previously described static pressure roller wheel 211 to assure good frictional contact of the roller wheel 211 both with the time wheel 151 and with the pressure plate 109 which has both its upper and lower surfaces covered with rubber or neoprene or the like to assure good frictional contact with both the roller wheel 211 and with the counter wheel 110 (Figures 1 and 9). The speed of rotation of the pressure plate 109 thus depends upon the radial position of the static pressure roller wheel 211. The axis of the pressure plate 109 is spaced to the left of the axis of the time plate 151 as is apparent from Figure 5 so that whenever the static pressure roller 211 rotates it will drive the pressure plate 109.

A differential pressure carriage 232 shown best in Figures 1, 14 and 15 has a pair of spaced bosses 233 and 234 which are bored for the reception of the carriage rod 203 upon which the carriage 232 is slidably and rotatably journalled. At one end the carriage 232 has a hollow boss 239 containing spaced ball bearing assemblies which journal for rotation a shaft 235 to which is fixedly attached the roller counter wheel 110, which wheel is similar to the static pressure roller wheel 211, being of stainless steel and having a highly polished periphery. The differential pressure cams 114a and 114b are rigidly secured to a flat shoulder 236 and to a stud 237 by a pair of screws 238. The profiles of the cam edges 241a and 241b are in accordance with the mathematical formula for the particular chart being integrated. A set screw 242 (Figure 7) in bracket 201 and a similar set screw 243 (Figure 9) in bracket 202 limit the movement of the bracket 232 so that the locus of movement of the counter wheel 110 is from the axis of rotation of the pressure plate 109 to the periphery thereof, along a radius of pressure plate 109 paralleling carriage rod 203. The shifting of the differential pressure carriage 232 along rod 203 is effected by the carriage control lever 121 which is connected at its outer end to a link 244 secured at its other end to the carriage 232 as by a pin 245 (Figure 5) passing through a hole 245a (Figure 14) in the carriage 232. As previously explained, movement of control lever 121 is responsive to movement of operating lever 105 under the control of the operator as in making the differential pressure pen on arm 107 of Figure 1 follow the recorded differential pressure line on the chart 104.

The counter 111, which may be of the well known "Veeder" type, is suitably secured to a cylindrical tube 246 (Figure 5) that is mounted at its other end as by an integral shoulder and screws 247 through the shoulder into the boss 239 on the differential pressure carriage 232. Within the tube 246 passes a shaft 248 that connects the shaft of counter wheel 110 to the input shaft of the counter. The number of turns of the counter wheel 110 is directly proportional to the total volume in cubic feet at atmospheric pressure that has passed through the orifice meter and recorded by the meter upon chart 104. The difference in the readings of the counter 111 taken before and after an integrating operation will give some multiple of the volume in cubic feet of gas registered by the meter during a revolution or a fraction of a revolution of the chart 104.

The counter tube 246 includes as a part of its complete assembly with the boss 239 an elongated flat plate 251 forming a pivot bar (Figures 5 and 9) that parallels tube 246, being journalled upon tube 246 by means of legs 249 and 250 and forming a portion of a brake mechanism, as will be explained.

*Principal or Westcott pen arm center assembly*

The functions of the particular static pressure cams 112a—112d and the differential pressure cams 114a or 114b are to cause the pairs of pen arms used while integrating any particular chart to follow the recorded lines on the chart in response to the manipulations of the operating levers 105 and 106. The movements of the static pressure cam follower arm 113 and the differential pressure cam follower arm 115 control the pairs of pen arms in the following manner.

In Figure 7 are shown sections through the axis of rotation of all three of the assemblies carrying the pen arm assemblies of Figures 1, 3 and 4, the pen arms 107 and 108 of Figure 1 being shown in Figure 7. As shown in Figure 7 a hollow cylindrical boss 252 depends from the base 101. The open bottom end of the boss is closed by a cap plate 253 suitably seated within the boss and secured thereto by screws 254. At its center the cap plate 253 mounts the outer race of a ball bearing assembly 255, the inner race of which supports the lower end of a vertical shaft 256. The upper end of shaft 256 is mounted in the inner race of a ball bearing assembly 257, the outer race of which is mounted in an overhanging arm 259 (see also Figure 9) of bracket 202. A cap 261 mounted in the arm 259 prevents foreign matter from entering the bearing assembly. The differential pressure cam follower arm 115 (Figures 1 and 7) is suitably keyed or pinned to the shaft 256 as by pin 259 just below the upper bearing assembly 257. At its lower end, just above the lower bearing assembly 255 the shaft 256 has suitably keyed or pinned to it a drum 262 having a cylindrical periphery, the purpose of which will be explained.

At its outer end the cam follower arm 115 carries a cam follower 263 which is preferably in the form of a ball bearing assembly having its inner race mounted upon a vertical stud 264 that is mounted in the arm 115. Stud 264 is urged downwardly by a spring 265 between the cam follower 263 and the arm 115, downward movement being limited to two positions by a pin 266 which may selectively be seated either in a lower or deep slot 267 in the top of arm 115 or a higher or shallow slot 268 at right angles to slot 267. A knob 271 on the upper protruding end of stud 264 is used in selectively positioning the stud 264 and the cam follower 263 in either of two vertical positions to select the cam 114a or 114b depending upon the chart being integrated.

Protruding on the opposite side of the vertical shaft 256 from the cam follower arm 115 and integral with arm 115 is a short arm 272 (Figures 7, 16 and 17) on the outer end of which is a support for the Westcott center differential pressure pen arm 123 of Figure 3. The outer end of arm 272 has a vertical slot therethrough to provide a space between a pair of bosses 273 through which is threaded an adjusting screw 274 having a central unthreaded cylindrical bearing portion 279 (Figure 16) between the spaced bosses 273. The screw 274 may be adjusted to vary the position of the bearing portion 275, and after adjustment the screw is locked in place by a plate 275 having a rocking ridge 276 (Figure 17), the plate being secured by a screw 277 that rocks the plate 275 counter-clockwise as viewed in Figure 17 to press its right end against screw 274 to lock it in adjusted position. The bearing portion 279 of the screw is the means by which the static pressure pen arm 123 of Figure 3 is secured to the short arm 272 as will be described later.

A circular plate 278 (Figure 7) is seated against a shoulder within the hollow boss 252, being forced thereagainst by the cap plate 253. This plate 278 forms the support for the outer race of a ball bearing assembly 281, the inner race forming a lower support for an integral drum or pulley 282 and hollow shaft 283 surrounding the vertical shaft 256 of the "Westcott" center assembly. Slightly above the mid-point of its length the hollow shaft 283 is supported by a ball bearing assembly 284 (Figure 7) mounted within a cylindrical housing 285 protruding upwardly above the base 101. The static pressure cam follower arm 113 is mounted upon the hollow shaft 283 but may rotate with respect thereto. At its outer end arm 113 has a cam follower roller 286 formed by the outer race of a ball bearing assembly mounted upon the end of a vertically adjustable shaft 287 (Figure 19) that has four selective vertical positions. Vertical adjustment of shaft 287 (and the cam follower roller 286) is provided by rack teeth on shaft 287 and a rack pinion gear 288 (Figure 18) on a horizontal shaft 291 having pinned thereto a knob 292. The inner face of the knob 292 has four equiangularly spaced depressions 293 (Figure 19) which are selectively engaged by a spring pressed ball 294 (Figure 18) to hold the knob 292 and the roller 286 in their selected positions depending upon the chart that is being integrated. This, together with the two position adjustment of follower 263 on follower arm 115 is an important difference over the construction disclosed in the aforesaid Patent 2,128,834 to McGay, where the two shafts that support the cam follower arms are raised or lowered, depending upon the cams that are used to integrate different charts.

As best shown in Figures 1, 5 and 18, the cam follower arm 113 includes a bell-crank arm 295 having at its outer end a face 296 (Figure 18) that is radial with respect to the axis of hollow shaft 283, and protruding from this face is a spherical knob portion 297. The exact distance of the axis of the knob 297 from the pivotal axis of the static pressure cam follower arm 113 is important. Accuracy is obtained by having the knob 297 as an off-center head of stud 299 (Figure 18) pressed into the arm 295. Exact position of the axis of knob 297 is adjusted by turning it, and then it is locked in position as by a set screw not shown.

Mounted upon the hollow shaft 283 above the static pressure cam follower arm 113 and secured to shaft 283 by a pin or screw 289 is a set back assembly including a hub 298 (Figure 7) upon which is mounted a pair of lever arms 301 and 302 (Figure 5). Lever arm 301 is similar to the arm 272 on the cam follower arm 115 in that it includes a screw 303 having a cylindrical bearing 304 (Figure 5) between a pair of spaced bosses 305 and also having a rocking plate 306 similar to rocking plate 275 of Figures 16 and 17, upon which bearing 304 is mounted the static pressure pen arm 122 of Figure 3 as will be described.

The other lever arm 302 on the hub 298 carries adjusting mechanism indicated generally at 307 in Figure 5, and shown in section in Figure 20. As shown in the latter figure, lever arm 302 has at its outer end a cavity 308 that is closed by a circular plate 311 fixedly seated in a shoulder 312 and secured in place by screws (not shown). A set back adjusting screw 313 is journalled for rotation in a bushing 314 in the center of plate 311 and also in the arm 302 at 315 (Figure 20). The screw 313 does not move axially, being constrained thereagainst by bushings 314 and 316, between which there is affixed to the adjusting screw 313 for rotation therewith a gear 317 that engages a pinion 318 upon an indicating counter 321. The left end of adjusting screw 313 is threaded at 322 to thread into a nose 323 which has a flat outer face in engagement with the round knob 297 on the outer end of bell crank arm 295. Rotation of nose 323 is prevented by a pin 324 slidable through a hole in the nose, and fixed at its other end in plate 311 and bushing 314. Lever arm 302 is resiliently urged clockwise as viewed in Figure 5 so that nose 323 constantly bears against knob 297 upon bell crank arm 295 in a manner to be described. The relative angular positions of lever arms 302 and the differential pressure cam follower arm 115 are thereby adjustable by turning a knob 325 on the right end of adjusting screw 313, and the ratio of the gear teeth on the gear 317 and pinion 318 as well as the lead of the threads 322 and the indicator discs of indicating counter 321 are such that the indicating counter indicates directly the atmospheric pressure at which it is set. By this construction the relative angular positions of lever arm 302 and cam follower arm are adjusted in accordance with a predetermined pressure setting that is indicated by the indicating counter 321.

It will be apparent that the respective angular positions at any time of the drum 262 on the bottom of shaft 256, (Figure 7) and of the drum 282 on the bottom of shaft 283 will depend upon the momentary positions of the cam follower arms 115 and 113 respectively and of the setting of the static pressure adjusting mechanism 307. These angular positions are transmitted to the mechanisms that actuate the pen arms of Figures 4 and 1 in the following manner, it being understood that the mechanism that positions the ("Westcott" center) pen arms of Figure 3 have been completely described heretofore. Referring to Figure 7, there is shown a hollow cylindrical boss 326 similar to the hollow cylindrical boss 252 except that it is smaller in diameter. The cap plate 327 thereof mounts a ball bearing assembly 328 that journals the lower end of a vertical shaft 331. Drum 332 is fixed to shaft 331 for rotation therewith. A plate 333 is seated within the boss 326 and supports a ball bearing assembly 334. The inner race of which supports a hollow cylindrical shaft 335 and integral or pulley drum 336. Drum 336 is coplanar with drum 282 of the "Westcott" center and drum 332 is coplanar with drum 262 of the same center.

The hollow cylindrical shafts 335 is also supported by the inner race of a ball bearing assembly 337 mounted in the cast base 101. Above the top surface of the base 101 at that point is secured to the hollow cylindrical shaft 335 a U shaped member 338 that carries in its upper leg 339 a ball bearing assembly that journals the upper end of the vertical shaft 331.

The upper leg 339 at its outer end includes a horizontal arm 342 (Figure 5) which is bifurcated to provide a pair of spaced bosses which carry a screw 343 similar to the screw 274 (shown in detail in Figure 16) and mounted in the bosses in the same way, to carry the static pressure pen arm 126 of Figure 4. The other pen arm 127 is similarly mounted on a screw 344 on the outer end of an arm 345 that is rigidly secured to the vertical shaft 331 between the upper and lower legs of the U shaped member 338.

Adjacent the right end of the base 101 is (Figure 7) a third hollow boss 346, closed at its bottom by a cap 347. A vertical shaft 348 is journalled in a bearing 349 in cap 347 and in a second bearing 352 in the top wall of the base. A (differential pressure) drum 353 is suitably keyed to the shaft 348 in the same horizontal plane as the other differential pressure drums 262 and 332. A hollow shaft including a (Static Pressure) drum 354 surrounds the shaft 348 but is not journalled upon it, being journalled upon spaced bearings 355 and 356 within the hollow boss 346. This drum 354 is in the same horizontal plane as the other static pressure drums 282 and 336. The differential pressure pen arm 107 is carried by an arm 355 rigidly secured to the top of vertical shaft, and the static pressure pen arm is carried by a longer arm 356 rigidly secured to the top end of the hollow shaft that includes the drum 354. The arms 107 and 108 are readily detachable by means of the spring clips 357 and 358 which secure them to the arms 355 and 356. These clips are similar to the spring clips on all of the pen arms, and will be described later.

*Tape drive for all three pen arm centers*

The principal or "Westcott" pen arm center assembly is directly driven by static and differential pressure cam follower arms 113 and 115, and the other two pen arm center assemblies are driven by the "Westcott" assembly in the following manner.

A vertical stud 361 (Figures 7 and 6) is threaded into the top wall of the base 101 and provides a support for a pair of bell cranks 362 and 363. The upper bell crank 362 is in the same horizontal plane as the static pressure pulleys or drums 282, 336 and 354, and the lower bell crank is in the same horizontal plane as the lower differential pressure pulleys or drums. As is apparent from Figure 6 one arm of each bell crank is longer than the other. The bell cranks are mounted upon the stud 361 by suitable bearing assemblies that permit them to operate freely in a horizontal plane.

As viewed in Figure 6, a thin flexible metal tape 365 is secured at one end to the end of the short arm of bell crank 363, as by a hook 366, to provide a free pivotal connection. The tape 365 passes clockwise around the lower drum 332, thence toward and around the lower drum 262 of the "Westcott" assembly in a clockwise direction, thence to the lower drum 353 of the rightmost pen arm assembly, around which it passes in a counter-clockwise direction. From drum 353 it extends toward the long arm of the bell crank 363, but does not extend all the way thereto, being connected to one end of a coiled tension spring 367, the other end of which is connected to the outer end of the long arm of the bell crank. It is apparent that although the same spring applies tension to both ends of the tape, through the bell crank 363, because the tension is applied by arms of different lengths, the effect is that drums 332 and 262 are urged in a counter-clockwise direction by the tension in spring 367. This force is transmitted by the lower drum 262 and central shaft 256 of the "Westcott" assembly to the differential pressure cam follower arm 115 so that the roller 263 at the end thereof is urged against the selected differential pressure cam 114a or 114b.

Slippage of the tape 365 around the drums is prevented by securing it to each drum as by a pin such as shown at 368 (Figure 6) by which it is secured to drum 262. Such pins are placed about midway of the arc of the drum engaged by the tape when the drum is in a position corresponding to the center of the maximum stroke of the pen arm. In Figure 2 are shown slots in the hollow bosses 326, 346 and 252 to permit passage of the tape thereinto to engage the drums. In addition, the central hollow boss 326 is provided with another pair of slots, one being shown at 371. These slots permit the tape 365 to pass through the boss but at a point outside the periphery of the drum in that plane, and are required because the boss lies in the path of the tape 365 between the bosses 252 and 346.

The upper or static pressure drums 282, 336 and 354 are connected in the same manner as described above by a similar metal tape 372 connected at its ends to the tension spring 373 and to the short arm of the upper bell crank 362. Spring 373 is connected to the long arm of the upper bell crank 362. The tension in spring 373 biases the roller on the static pressure cam follower arm 113 against the static pressure cam.

*Stop mechanism*

Referring to Figure 9, a hollow cylindrical housing 375 protrudes downwardly from the top wall of the cast base 101, being secured to the base by screws 376 passing through a flange on the housing. A cylindrical plunger 377 is vertically reciprocable within the housing 375, being prevented from turning therein by a journal pin 378 (Figure 24) extending diametrically through the plunger and protruding through a vertical slot in the wall of housing 375. As best shown in Figures 22 and 23 the plunger 377 terminates at its upper end in a diametric extension 379 that protrudes upwardly into a space between the peripheral downwardly extending teeth 382 on the bottom of the chart plate 103 when the plunger 377 is in the raised position. In Figures 9 and 21–23 the plunger 377 is in its depressed position.

As shown in Figures 22 and 23 the extension 379 has a cut away portion forming a shoulder 383 for engagement by a latch 384 which is pivoted upon a pin 385 on another lever 386 extending substantially diametrically through opposite slots in the wall of housing 375 at the bottom thereof. Lever 386 extends beneath the plunger 377 and is pivoted about the horizontal pin 386a. A trip lever 387 is also pivoted upon the pin 385, but is affixed to latch 384 for movement therewith, forming a substantially integral assembly. At its upper end the trip lever 387 terminates in a trip arm 388 extending substantially at right angles to the lever itself. The trip lever and latch assembly are resiliently urged clockwise and upwardly as viewed in Figure 22 by a pair of tension springs 389 having their other ends connected to an eyelet on the housing 375. The upward movement of the trip and latch assembly under bias of the two springs 389 is limited by engagement of the top of lever 386 with the base 390 of the slots in the bottom of housing 375. Clockwise bias by springs 389 causes the latch to engage the shoulder 383 of the plunger when the plunger is depressed to hold the plunger 377 depressed until released by mechanism to be described. In its depressed position the plunger 377 just clears the top of lever 386, as best seen in Figures 21 and 22.

A rocking reset lever 391 (Figure 9) is pivotally mounted upon a central bracket 392 (see also Figure 6) for pivotal movement about a pivot 393. The reset lever 391 has a slot 394 within which is engaged the pin 378 (Figures 24 and 9) so that counter-clockwise movement of the reset lever 391 as viewed in Figure 9 will depress the chart plate stopping plunger 377 for engagement by the latch 384. Means yet to be described are effective to apply a resilient force to urge reset lever 391 clockwise to raise the plunger 377 for engagement of its extension 379 between teeth 382 upon the chart plate to stop the chart plate when the plunger is released from its latch 384. The depression of reset lever 391 and plunger 377 against the action of this resilient force is by means of a reset plunger 395 (Figure 9) that is guided for linear motion by a bushing 396 in the top wall of the cast base 101. The lower end of the reset plunger 395 is pivotally connected to the forward end of the reset lever 391 by a pivot pin 397. The resilient force that urges the plunger 377 upwardly is the result of mechanism now to be described that urges the right end of reset lever 391 downwardly as viewed in Figure 9, where however, the right end of lever is out of sight behind the clutch drum 193 as is apparent from Figure 6.

As shown in Figures 6 and 2 the rear end of the reset lever 391 is pivoted by a pin 398 to one end of a rocker arm 401 that is pivoted for rotation by a pivot bracket 402. The other or rear end of the rocker arm 401 has a slot 403 which engages a peripheral groove near the bottom end of a vertically reciprocable rod 404. The rod 404 (Figure 9) is formed as a reduced diameter portion of a shaft 405 journalled for vertical sliding movement in a tube 406 which protrudes upwardly above the top surface of the cast base 101 to which it is secured by a nut 407. Rotation of shaft 405 is prevented by a pin 408 (Figure 9) protruding into an axially extending slot 409 in tube 406. A compression spring 412 surrounds the rod 404 between the nut 407 and the enlarged shaft 405.

The upper end of shaft 405 terminates in a smaller diameter threaded portion 413 above a shoulder 414 upon which is seated a threaded collar 415 having a shoulder upon which is received a horizontal arm 416 that extends under and in contact with the bar or flat plate 251 that is pivoted on the counter tube 246. The arm 416 is rigidly secured to the collar 415 and the top of the shaft 405 by a round headed nut 417 on the threaded portion 413 of the shaft 405. Arm 416 has an upstanding post 418 upon which is pivoted a lever 421 that extends over the pivoted bar or plate 251 and has a downwardly protruding rounded hardened pin 422 engaging the top surface of bar 251. The lever 421 and pin 422 are urged downwardly against the pivoted bar 251 by a tension spring 423 (Figure 9) connected at its other end to an adjustable screw 424 in the base 101. The spring 423 is effective to lightly clamp the pivoted bar against the arm 416 so that vertical movements of shaft 405 result in rotating movements of the pivoted bar 251.

The shaft 405 is urged upwardly to the end of its stroke by the compression spring 412 within the tube 406. This spring is also effective to act through rocker arm 401 and reset lever 391 to raise the chart plate engaging extension 379 (Figure 9) to engagement with the spaces between the teeth 382 on the chart plate, and this spring 412 provides the resilient force previously referred to. In the condition of the apparatus shown in Figure 9, the reset plunger 395 is depressed, latch 384 is holding plunger 377 depressed with its extension out of engagement with the teeth 382 of the chart plate, and the chart plate is free to rotate. The shaft 405 has been depressed to its bottommost position by the linkage of reset lever 391 and rocker 401.

The chart plate shaft 185 includes an enlarged flange 425 (Figure 9) between the chart plate 103 and the upper bearing for the chart plate shaft 185, and a swivel plate 426 is journalled for rotation upon this flange. A spring stop member 427 is rigidly secured to the plate 426 in any suitable manner, and extends radially to the periphery of the chart plate where it extends upwardly and terminates in a finger piece 428 whereby it may be depressed to change the angular position of the spring stop member with respect to the chart plate. Normally the spring stop member 427 is in the raised position of Figure 9, between a pair of teeth 382, and is carried around with the chart plate when it revolves.

A striker 429 is carried by and protrudes downwardly below the spring stop member 427, in such position as to engage and shift the trip arm 388 when the chart plate has reached the end of a complete revolution or portion thereof. This shifting of the trip arm 388 disengages the latch 384 from the shoulder 379 (Figure 22) on the extension 379 of plunger 377, thereby releasing the extension 379 under the influence of compression spring 412, to engage the teeth 382 on the chart plate, thereby stopping the chart plate. The striker 429, as it engages the trip arm 388 to pivot the latch 384 away from engagement with the plunger 377 will remain in engagement with the trip arm when the plunger extension 379 engages and stops the chart plate. The spring stop member 427 and striker 429 are so arranged that when the striker releases the latched plunger 377, the extension 379 will engage the same chart plate tooth space occupied by the spring stop member. When the chart plate has been stopped by the automatic release of the latching means, the plunger 377 may be relatched in either of two ways. Depression of the finger piece 428 will depress the striker 429 out of engagement with the trip arm 388 permitted a clockwise movement of the latch assembly under bias of the springs 389 to latch the member 384 over shoulder 383 of the plunger 377 which is simultaneously depressed by the finger piece. Alternatively, a depression of the plunger 377 by depressing the reset plunger 395 will cause the lower end of plunger 377 to engage the lever 386 to pull the trip lever arm 388 below the level of striker 429 which permits the latch assembly to move clockwise into latching engagement with the shoulder 383 under bias of springs 389. When pressure on the reset plunger is released, the plunger 377 is biased upward a short distance with the latch assembly until the lever 386 abuts the base 390 of the slots in housing 375 and prevents further upward movement of the plunger 377.

A brake for the counter wheel 110 is actuated at the same time that the chart plate is stopped, and the counter wheel is simultaneously lifted out of engagement with the pressure plate 109 in the following manner.

Referring to Figures 5 and 25, a hook shaped brake lever 432 is pivotally mounted upon pivot pin 433 threaded into the differential pressure carriage 232, the brake lever 432 lying in the vertical plane between the boss 239 and the counter wheel 110. Adjacent its free end the brake lever is secured as by a screw 434 to an end portion of the flat plate or bar 251, so that as the bar 251 is tilted by the movements of the reciprocable shaft 405 the brake lever 432 will be raised or lowered. At the extremity of its free end the brake lever 432 carries a protruding brake shoe 436 of molded rubber or the like for engagement with the periphery of the counter wheel 110 when the brake lever is raised and moved counter-clockwise about its pivot 433 under the influence of the pivoted bar 251. Actual movement of the brake lever 432 with respect to the counter wheel is limited by means of an adjustable eccentric headed screw 437 (Figure 25) having its head within a hole 438 in the brake lever. Thus the brake lever can be so positioned that the shoe 436 can be extremely close to the counter wheel when disengaged therefrom. In operation after the brake shoe 436 engages and stops the counter wheel, continued lifting of the brake lever by the pivot bar 251 results in the lifting of the entire differential pressure carriage assembly about its pivot, and the consequent disengagement of the counter wheel from the pressure plate 109, all this concomitantly with the stopping of the chart plate 103 by the release of plunger 377 and engagement of its extension 379 with the chart plate between two teeth 382.

In practice the orifice meter charts are of such size, and driven at such speed that one revolution is equivalent to 24 hours use. If however only a six hour period is to be integrated the spring stop member 427 is disengaged from the teeth 382 by depressing the finger piece 428 and moving it back (clockwise, as viewed in Figure 5) for twenty-four teeth, each tooth corresponding to fifteen minutes. Then after the chart plate is released for rotation by depressing the reset plunger 395 after energizing the drive motor 152 or 152a by closing a foot control switch (not shown), the chart plate will rotate through 90 degrees until it is stopped by the mechanism described. For a full revolution of the chart plate of course the spring stop member is not shifted as described above, and the chart plate is rotated through a full 360 degrees by depressing the reset plunger 395, stopping when the 429 engages the trip arm 388 to release the plunger 377 and stop the chart plate, simultaneously braking the counter wheel 110 and raising it to disengage it from the pressure plate 109. Momentum of the moving parts of the driving motor, etc., after the energizing current has been cut off by the foot switch merely causes slippage between the clutch drum 193 and clutch shoe 195.

Whenever the reset plunger 395 is depressed fully to start an integrating operation, the bottom of plunger 377 depresses the lever 386 against the force of springs 389, so that latch 384 can again engage shoulder 383 to hold the plunger depressed after reset plunger 395 is released. This action again places trip arm 388 in the path of striker 429.

*Other improvements*

The settings of the arms carrying the pen arms must be accurate, and various clamping or securing means such as shown for the several arms in Figure 7 may be used for accurately positioning the pen arms with respect to the solid or hollow shafts upon which they are mounted. However, such settings are sometimes difficult to make, particularly because of the fact that a small angular displacement of shaft and arm at the shaft axis results in such a large displacement at the outer end of the pen arm. For this reason we have devised a vernier adjustment shown in Figures 26, 27 and 28 which is shown particularly with respect to the U shaped pen arm supporting member 338 for the static pen arm 126 (Figure 4) of the Foxboro center, although as will be apparent, the same principle is applicable to the arms or supporting members upon which the several other pen arms are mounted, such as the supporting member 272 of Figures 16 and 17.

Referring to Figures 26 to 28 the top leg of the U shaped supporting member 338a is in two parts 339a and 442, the part 339a being fixedly secured to vertical shaft 331 (Figure 7) by a clamp screw 443 (Figure 27), and the part 442 being pivotally mounted about a circular upstanding shoulder 444 upon the part 339a. The pivoted part 442 carries at its outer end a screw 343 upon which may be mounted a removable pen arm. The pivoted part 442 has a circular arcuate slot 445 through which passes a rivet or screw 446 secured to the part 339a, to hold the two parts assembled, but permitting relative rotatable movement therebetween. A vernier adjustment between parts 339a and 442 is provided by an adjusting screw or worm 447 rotatable within part 442 but secured against axial movement therein. Screw 447 engages the teeth of a circular rack or gear segment 448 (Figure 28) fixedly secured to part 339a. Turning of screw 447 provides a vernier adjustment between parts 339a and 442 and a clamp screw 449 passing through arcuate slot 450 in part 442 secures the adjustment against slipping when tightened.

In Figures 29–31, there are shown the details of the spring clip by which the pen arm 107 of Figure 7 is attached to the arm 355 of the pen arm center assembly. The body of the clip 452 includes an upper tubular portion which receives with a press fit the inner end of the pen arm. Preferably the pen arm is soldered to the tubular portion to prevent looseness therebetween. The lower portion of the clip is substantially channel shaped, having a flat central wall 454 and identical perpendicular side flanges 455 and 456 protruding in the same direction from the central wall. The entire clip so far described may be stamped and shaped from a single piece of flat metal. A pin 457 is mounted in the side flanges and carries a lever 458 pivoted thereon and centered by a pair of spacing collars 459. The lever 458 is urged counter-clockwise by a tension spring 460, the other end of the spring being connected to a pin 461 passing through the tubular portion 453 of the clip. The inner end of the lever has a notch 462, which as shown in Figure 31 engages with the central groove of the adjusting screw 463. As shown in Figure 29, the flanges 455 and 456 have notches 464 that engage in the outer grooves of the adjusting screw. The details of an adjusting screw are best shown in enlarged detail in Figures 16 and 17 wherein one of the grooves, 465, is shown as V shaped, to positively locate the clip axially of the screw.

The various pen arms are all equipped with similar clips, and all are attached or detached in the same manner. It will be apparent that while the clips attach the pen arms securely against axial rotation with respect to the pen arm centers the pen arms may pivot about the adjusting screws so that the outer ends of the pen arms rest upon the chart. Once the adjusting screws are set properly and secured as described earlier in this specification the pen arms may be attached or detached as desired, no adjustments being needed.

*Summary*

The operation of the integrator will be apparent to those skilled in the art. It is apparent that the number of static or differential pressure cams used may be varied from one of each up to any number determined by the number of positions of the cam follower rollers 263 and 286, and different cams of either type may be substituted in accordance with the type of chart to be integrated and the absolute pressure of the gas recorded by the chart. Looseness and backlash is completely eliminated by the flexible tape drive for the different pen arm assemblies. The adjustment provided in the setting of the static pressure pen arms by the bell crank arm 295 and the adjustable lever arm 302 and indicated by the counter 321 facilitates the use of the instrument since the pen arms are all simultaneously correctly positioned in accordance with the static pressure at the instrument at the time of the recording merely by setting the counter 321 to the proper absolute static pressure. The various pairs of pen arms are readily attachable and removable from their supports when the different types of charts are to be integrated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a device of the class described, a movable carriage; a plurality of spaced parallel cams on said carriage having cam profiles of different outlines; a cam follower arm journalled in axially fixed relation so as to be movable in a single plane parallel to the planes of said parallel cams; a cam follower on said follower arm; means movably mounting said cam follower for shifting movement in a direction perpendicular to the plane of the follower arm including means for shifting said cam follower with respect to said follower arm for selective engagement with any of said cams; and means for securing said cam follower in selected position.

2. In a device of the class described, a movable carriage; a plurality of spaced parallel cams on said carriage, having cam profiles of different outlines; a cam follower arm mounted so as to be movable in a single plane parallel to the planes of said parallel cams; a rotatable cam follower on said follower arm; a shaft axially shiftable in a direction perpendicular to the plane of said follower arm, and rotatably mounting said cam follower, resilient means operable to urge said shaft in one direction, and a plurality of stop means operable against the action of said resilient means to secure said cam follower in selective positions for engagement with any of said cams.

3. In a device of the class described, a movable carriage; a plurality of spaced parallel cams on said carriage, having cam profiles of different outlines; a cam follower arm mounted so as to be movable in a single plane parallel to the planes of said parallel cams; a rotatable cam follower on said follower arm, a shaft axially shiftable in a direction perpendicular to the plane of said follower arm, and rotatably mounting said cam follower; rack teeth on said shaft; a rotatable gear engaging said rack teeth; means for rotating said rotatable gear for shifting said shaft; and means to stop said rotatable gear in selected positions to secure said cam follower in selective positions for engagement with any of said cams.

4. In a calculating machine for integrating a curve on a chart; supporting means for a chart to be integrated; means for driving said supporting means, means forming a plurality of sets of pen arm centers; a plurality of sets of pen arms constructed to be selectively mounted upon said sets of pen arm centers for tracing static pressure and differential pressure record traces on a chart on said supporting means; a plurality of differential pressure cams shaped in accordance with differential pressure ranges; a first adjustable cam follower selectively positionable to engage any one of the differential pressure cams of said set; a plurality of static pressure cams shaped in accordance with static pressure ranges; a second adjustable cam follower selectively positionable to engage any one of said static pressure cams; means operable to actuate said cam followers in accordance with the positions of any of said sets of pen arms and flexible tape drive means connecting all of said pen arm centers to position them concomitantly in accordance with the positions of said cam followers on said cams, and including resilient means operable to maintain tension in said tape.

5. In a calculating machine for integrating a curve on a chart: a chart supporting means; a plurality of sets of concentric rotatable shafts forming chart follower arm centers for the support of chart follower arms operable to trace curves on a chart on said support; means for rotating one set of said concentric shafts; a plurality of flexible tape means connecting corresponding shafts of said concentric sets to drive corresponding shafts concomitantly in one direction; and resilient means connected to each tape means to maintain tension therein and to drive said corresponding shafts in the other direction.

6. In a calculating machine for integrating a curve on a chart: a chart supporting means; a plurality of spaced parallel rotatable shafts forming chart follower arm centers for the support of chart follower arms operable to trace curves on a chart on said support; means for rotating one of said shafts; flexible tape means interconnecting said shafts to drive them concomitantly in one direction; and resilient means connected to said tape to maintain tension therein and to drive said shafts in the other direction.

7. In a calculating machine for integrating a curve on a chart; a chart supporting means; a plurality of rotatable shafts forming pen arm centers for the support of pen arms operable to trace curves on a chart on said support; means for rotating one of said shafts; flexible tape means connecting all of said shafts to drive them concomitantly in one direction; and resilient means connected to said tape to maintain tension therein and to drive said shafts in the other direction.

8. In combination a base member; a series of shafts mounted on said base member for rotation about parallel axes; a drum fixed upon each of said shafts so that all drums are in the same plane; means for rotating one of said drums; a bell crank mounted for rotation upon said base member, with the ends of its crank arms in the same plane as said drums and having one arm longer than the other; a tension spring connected at one end to the longer arm of said bell crank; a flexible tape connected at one end to the other end of said spring and passing partially around each of said drums for driving engagement therewith, the other end of said tape being connected to the shorter arm of the bell crank; whereby said spring maintains tension in said tape and biases drums for rotation in one direction.

9. In the combination defined in claim 8 a second series of shafts mounted upon said base member for rotation about axes coaxial with the axes of said first mentioned series of shafts; a second set of drums fixed upon said second series of shafts in a second plane spaced from the plane of the drums of said first mentioned series of shafts, a second bell crank mounted for rotation on said base in the same plane as said second set of drums and having one arm longer than the other; a second tension spring connected at one end to the longer arm of said second bell crank; a second flexible tape connected at one end to the other end of said second spring and passing partially around each of the drums of said second set for driving engagement therewith, the other end of said second tape being connected to the shorter arm of said second bell crank, whereby said second spring maintains tension in said second tape and urges all of the drums of said second set to rotate in one direction.

10. In the combination defined in claim 8, a chart support and means for moving it with respect to said shafts; means for mounting a chart upon said support; a pen arm for each of said shafts; and means on each of said shafts and upon each of said pen arms for rigidly securing each of said pen arms to its respective shaft for movement therewith.

11. In the device described in claim 8, a chart support and means for moving it with respect to said shafts; means for mounting a chart upon said support; a pen arm for each of said shafts; and cooperating releasable clamping means upon each of said shafts and upon each of said pen arms for rigidly but releasably securing each of said pen arms to its respective shaft for movement therewith, including a bearing member upon each shaft and a spring pressed clamp upon each pen arm.

12. In the combination in claim 8, each of said drums having a radial pin passing through an opening in said tape in that portion of the tape contacting the drum, to prevent slippage between said tape and said drums.

13. In an integrating machine for calculating fluid flow from records upon a chart: a chart support; means for driving said support; a pivoted chart follower arm operable to trace a recorded pressure line upon a chart carried by said chart support: rotatable means operable to register pressure in accordance with movement of said follower arm relative to said chart; manual means for positioning said follower arm to follow the recorded pressure line upon the chart; means connected to drive said registering means at a speed depending upon the position of said manual means and follower arm including means for changing the speed ratio of the drive for said registering means in accordance with a factor determined by atmospheric pressure.

14. In an integrating machine for calculating fluid flow from records upon a chart; a chart support; means for driving said support; a pivoted pen arm operable to trace a static pressure line upon a chart; a rotatable member operable to register static pressure in accordance with movements of said pen arm over a chart; manual means for moving said pen arm to follow the static pressure line upon the chart; means for driving said registering rotatable member at a speed depending upon the position of said manual means and pen arm; and means for changing the speed ratio of the drive for said rotatable member in accordance with a factor determined by atmospheric pressure.

15. In the device described in claim 14, the last mentioned means including an indicator reading directly in pressure terms to indicate the setting of the speed ratio of the drive.

16. In an integrating device for calculating fluid flow from recorded lines on a chart; a chart support; a movable carriage carrying a static pressure roller and at least one cam; a rotatable disc engaging said roller; a single power means for driving said chart support and said rotatable disc at a fixed speed ratio; manual means for shifting said carriage to change the speed ratio of the drive between the disc and the roller; first and second coaxially pivoted levers, each having two legs, a cam follower on one leg of one of said levers adapted to engage said cam, the second leg of the first lever engaging one leg of the second lever; a chart follower arm secured to the second leg of said second lever and positioned to trace a recorded line on a chart in response to movement of said manual means as transmitted through said carriage, cam, follower and levers.

17. In an integrating device for calculating fluid flow from records upon a chart; a chart support; a movable carriage carrying a static pressure roller and a cam; a rotatable disc engaging said roller; single means for driving said chart support and said rotatable disc at a fixed speed ratio; manual means for shifting said carriage to change the speed ratio of the drive between the disc and the roller; a shaft, a lever pivoted on said shaft and having a cam follower on one leg engaging said cam, and a second leg; a second lever on said shaft having a first leg connected to the second leg on said first lever, and a second leg; a pen arm secured to the second leg of said second lever in position to trace a line on a chart in response to movements of said manual means as transmitted through said carriage, cam, follower and levers.

18. In the device described in claim 17, adjustable means in the connection between the connected legs of said two levers to change the respective positions of said static pressure roller and said pen arm.

19. In the device described in claim 17, adjustable means in the connection between the connected legs of said two levers to change the respective positions of said static pressure roller and said pen arm, and including in said adjustable means to indicate the setting thereof, a graduated indicator reading directly in terms of atmospheric pressure.

20. In the device described in claim 17, adjustable means in the connection between the connected legs of said two levers to change the respective positions of said static pressure roller and said pen arm; second and third shafts parallel to the axis of said first mentioned shaft but located at different points around said chart support and adapted to support second and third pen arms; drums of different diameters on each of said shafts and in the same plane; a flexible tape passing around all three drums to move said shafts at the same time in response to movement of said manual means; and resilient means connected to said tape to urge all of said drums and shafts in one direction to maintain contact between said cam and said cam follower.

21. In the device described in claim 17 the second leg of said second lever including an outer portion adjustable with respect to the inner portion; rack teeth uopn one of said portions and a gear on the other portion of said leg; means for moving said gear; means for locking the inner and outer portions together; and means on said outer portion for fixedly attaching a pen arm.

22. In an integrating device for calculating fluid flow from records of charts from recorders of various types; at least one set of rotatable shafts disposed beside said support; means for shifting said shafts simultaneously in accordance with recorded trace lines upon a chart on said support; integrating mechanism responsive to movement of said shafts and said chart support; a trace line follower arm for each of said shafts; each of said shafts and trace line follower arms being provided with cooperating latch means for selectively attaching each trace line follower arm securely but releasably to its respective shaft.

23. In an integrating device for calculating fluid flow from records of charts from recorders of various types; a rotatable chart support; a series of rotatable shafts spaced around said support; means for shifting said shafts simultaneously in accordance with the recorded traces upon a chart on said support; integrating mechanism responsive to movements of said shafts and said chart support; pen arms for each of said shafts; each of said shafts and pen arms being provided with cooperating snap latches for selectively attaching each pen arm securely but releasably to its respective shaft.

24. In an integrating machine including a rotatable chart plate, a rotatable time plate, a rotatable pressure plate, and a shiftable idler wheel between the time plate and pressure plate to rotate the pressure plate at various speeds with respect to the time plate; a motor; a reducing gear box directly driven by the motor and having two output shafts at right angles to the motor shaft, said time plate being directly mounted upon one of said output shafts; and a drive shaft connected to said chart plate, and including a universal joint, connected to the other gear box outlet shaft.

25. In an integrating machine a base member supporting a rotatable chart plate, a rotatable time plate, a rotatable pressure plate, and a shiftable idler wheel between the time plate and pressure plate to rotate the pressure plate at various speeds with respect to the time plate; a gear box mounted on said base member, having an input shaft mounting said time plate and having an output shaft connected to drive said chart plate; a support rigidly attached to said base member; a drive motor having an output shaft; resilient mounting means for said drive motor connected to said support; a driving sleeve on said motor output shaft and engaging the periphery of said time plate to drive said time plate; and a covering of resilient material on the periphery of said time plate to increase the frictional contact between said driving sleeve and said time plate.

26. In an integrating machine including a base member supporting a rotatable chart plate, a rotatable time plate, a rotatable and tiltable pressure plate; a shiftable idler wheel between the time plate and pressure plate to rotate the pressure plate at various speeds with respect to the time plate, a motor for driving said chart plate and said time plate, a friction clutch between said motor and said chart plate, a counter wheel, and a tiltable carriage mounted on said base member for shifting movement relative to the plane of rotation of said pressure plate supporting said counter wheel in driving engagement with the pressure plate; teeth on the bottom of the chart plate; a reciprocable plunger carried by said base member and engageable with said teeth to stop said chart plate; a resilient means urging said plunger toward said teeth; a latch on said base member operable to hold said plunger disengaged; means carried by said chart plate to release said latch; a reset plunger mounted on said base member and connected to said reciprocable plunger to move it away from said chart plate teeth; a brake lever pivoted on said carriage and having a brake shoe engageable with said counter wheel; and means structurally connected with said reciprocable plunger and said resilient means, arranged to permit shifting movement of said carriage and lever and adapted to engage said shoe with said counter wheel upon movement of said reciprocable plunger into engagement with said teeth whereby said counter wheel is held against rotation and said carriage is tiltable to disengage said counter wheel and pressure plate.

27. In the device described in claim 26, said structurally connected means comprising a tube on said base member and having resilient means disposed therein; a shaft in said tube urged by said resilient means in one direction; linkage between said shaft and said reciprocable plunger operable to transmit the force of said resilient means to urge said reciprocable plunger toward said chart plate teeth; and means limiting the movement of said shaft in said tube.

28. In an integrating machine including a base, a rotatable time plate, a rotatable pressure plate, a counter wheel and a tiltable carriage mounted on said base for shifting movement relative to the plane of rotation of said pressure plate supporting said counter wheel in driving engagement with the pressure plate; a shiftable idler wheel between said time plate and said pressure plate; a brake lever pivotally mounted upon and shiftable with said carriage and having a brake shoe engageable with said counter wheel; an eccentric adjustably carried by said carriage to limit the distance of said brake shoe from said counter wheel when disengaged, and means for turning said brake shoe to engage said counter wheel to stop it and to lift it from said pressure plate.

29. In an integrating device including a chart support and a rotatable pen arm assembly drive including a rotatable shaft; a support adjustably attached to said shaft; a shiftable adjusting screw carried by said support, movable axially by turning the screw and having three spaced annular grooves; means for securing said screw against shifting; and a pen arm assembly including a clip having spaced notches engageable with the outermost of the grooves on said screw and a spring pressed lever engageable with the central groove to secure the pen arm assembly to the drive.

30. In an integrating device including a chart support and a rotatable pen arm assembly drive including a rotatable shaft; a support adjustably attached to said shaft; a cylindrical member carried by said support and having three spaced annular grooves; and a pen arm assembly including a clip having spaced coaxial notches engageable with the outermost of the grooves on said member and a spring pressed lever engageable with the central groove to secure the pen arm assembly to the drive.

31. In an integrating machine including support structure, a first rotatable means proportional to time, a second rotatable means proportional to pressure, a variable speed device adjustably engaged between said two rotatable means, means for adjusting said variable speed means in response to a condition indicative of absolute pressure, a counting means including a rotatable device adapted to be variably positioned in engaged relation to said second rotatable means, means including a tiltable shiftable carriage for carrying and positioning said counting means in response to a condition indicative of differential pressure, a brake lever pivotally mounted upon said carriage and having a brake shoe engageable with said rotatable device, and means engageable with said brake lever for turning said brake shoe to engage said rotatable device to stop it and to tilt said carriage and counting means away from engagement with said second rotatable means.

32. In an integrating machine including a support means supporting a rotatable chart plate, a motor drive for said chart plate having a friction clutch between the motor and chart plate and teeth on the bottom of the chart plate: a reciprocable plunger carried by said support member and engageable with said teeth to prevent rotation of said chart plate; resilient means urging said plunger toward said teeth; latching means disposed on said support means operable to hold said plunger in disengaged position comprising a lever disposed for limited movement in the path of movement of said plunger with one end pivotally mounted on the support means, a latch lever assembly pivotally connected to the other end of said lever, a resilient means urging the opposite end of the latch lever assembly toward latching engagement with said plunger and biasing said lever to its limit position toward said plunger; means carried by said chart plate to engage and pivot said latch assembly against the bias of said resilient means to unlatched position; reset means mounted on said support means and engaging said reciprocable plunger and operable to move it toward disengaged position whereby said plunger engages said lever and moves it away from its said limit position against the bias of said resilient means to thereby disengage said latch assembly from said means carried by said chart plate and permit said latch assembly to pivot into latching engagement under bias of said resilient means.

33. For use in the integrating machine defined in claim 14, an indicating counter, reading in terms directly related to pressure, having an input shaft with a drive coupling thereon; said indicating counter adapted to be removably fastened with the drive coupling coupled to and driven by the means for changing the speed ratio of the drive for said rotatable member.

34. For use in combination with an integrating device that has a chart support with a pen arm assembly drive, the drive including a rotatable shaft with a pen arm support attached to the shaft and a cylindrical member with at least three spaced annular grooves carried by the pen arm support: a pen arm assembly including a clip having spaced members with coaxial notches adapted to be engaged with the outermost of said three spaced annular grooves on the cylindrical member and a spring pressed lever intermediate said spaced members adapted to engage the central groove of the cylindrical member to secure the pen arm assembly to the pen arm support.

References Cited in the file of this patent
UNITED STATES PATENTS
2,057,664    McGaughy  ------------ Oct. 20, 1936